US012595173B2

(12) United States Patent
Hwang et al.

(10) Patent No.: US 12,595,173 B2
(45) Date of Patent: Apr. 7, 2026

(54) METHOD FOR PREPARING SYNTHESIS GAS

(71) Applicant: LG CHEM, LTD., Seoul (KR)

(72) Inventors: Sung June Hwang, Daejeon (KR); Tae Woo Kim, Daejeon (KR); Sik Ki, Daejeon (KR); Sung Kyu Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 919 days.

(21) Appl. No.: 17/794,492

(22) PCT Filed: Dec. 6, 2021

(86) PCT No.: PCT/KR2021/018398
§ 371 (c)(1),
(2) Date: Jul. 21, 2022

(87) PCT Pub. No.: WO2022/164007
PCT Pub. Date: Aug. 4, 2022

(65) Prior Publication Data
US 2023/0264951 A1 Aug. 24, 2023

(30) Foreign Application Priority Data
Jan. 29, 2021 (KR) ........................ 10-2021-0013214

(51) Int. Cl.
*C01B 3/34* (2006.01)
*C10G 7/12* (2006.01)
*C10G 9/02* (2006.01)

(52) U.S. Cl.
CPC .................. *C01B 3/34* (2013.01); *C10G 7/12* (2013.01); *C10G 9/02* (2013.01);
(Continued)

(58) Field of Classification Search
CPC ............... C01B 3/34; C01B 2203/063; C01B 2203/0833; C01B 2203/1235;
(Continued)

(56) References Cited

U.S. PATENT DOCUMENTS

| | | | |
|---|---|---|---|
| 3,862,899 A | 1/1975 | Murphy et al. | |
| 4,938,862 A | 7/1990 | Visser et al. | |

(Continued)

FOREIGN PATENT DOCUMENTS

| | | | |
|---|---|---|---|
| CN | 106947514 A | | 7/2017 |
| CN | 207162537 U | * | 3/2018 |

(Continued)

OTHER PUBLICATIONS

Machine Translation of CN 207162537 U (Year: 2025).*

*Primary Examiner* — Coris Fung
(74) *Attorney, Agent, or Firm* — Bryan Cave Leighton Paisner LLP

(57) ABSTRACT

Provided is a method for preparing synthesis gas, and more particularly, a method for preparing synthesis gas including: supplying a pyrolysis fuel oil (PFO) stream including a PFO and a pyrolysis gas oil (PGO) stream including a PGO discharged from a naphtha cracking center (NCC) process to a distillation column as a feed stream (S10); and supplying a lower discharge stream from the distillation column to a combustion chamber for a gasification process to obtain synthesis gas (S20).

16 Claims, 4 Drawing Sheets

(52) U.S. Cl.
CPC .................. *C01B 2203/063* (2013.01); *C01B 2203/0833* (2013.01); *C01B 2203/1235* (2013.01); *C10G 2300/1044* (2013.01); *C10G 2300/302* (2013.01); *C10G 2300/4081* (2013.01)

(58) Field of Classification Search
CPC ...... C01B 2203/062; C10G 7/12; C10G 9/02; C10G 2300/1044; C10G 2300/302; C10G 2300/4081; C10G 9/00
See application file for complete search history.

(56) References Cited

U.S. PATENT DOCUMENTS

| | | | | |
|---|---|---|---|---|
| 10,689,587 | B2 * | 6/2020 | Al-Sayed | ................. C10G 9/36 |
| 2009/0159494 | A1 | 6/2009 | Gautam et al. | |
| 2010/0294994 | A1 | 11/2010 | Basini et al. | |
| 2019/0203130 | A1 * | 7/2019 | Mukherjee | ............. C10G 69/14 |
| 2019/0292467 | A1 * | 9/2019 | England | ................... C10F 5/06 |
| 2020/0369966 | A1 * | 11/2020 | Bitting | ..................... C10G 9/20 |

FOREIGN PATENT DOCUMENTS

| | | | | |
|---|---|---|---|---|
| EP | 0916739 | A2 | 5/1999 | |
| GB | 719003 | A | 11/1954 | |
| JP | 01-252696 | A | 10/1989 | |
| JP | 2002-226873 | A | 8/2002 | |
| JP | 2008-050303 | A | 3/2008 | |
| JP | 4409977 | B2 | 2/2010 | |
| JP | 2020-517797 | A | 6/2020 | |
| KR | 10-0304820 | B1 | 9/2001 | |
| KR | 10-2004-0028622 | A | 4/2004 | |
| KR | 10-0486162 | B1 | 4/2005 | |
| KR | 10-2010-0096800 | A | 9/2010 | |
| KR | 10-1236664 | B1 | 2/2013 | |
| KR | 10-1673491 | B1 | 11/2016 | |
| KR | 10-2017-0089253 | A | 8/2017 | |
| KR | 10-2020-0055472 | A | 5/2020 | |
| WO | 2016/059565 | A2 | 4/2016 | |
| WO | WO-2018111577 | A1 * | 6/2018 | ............. C10G 45/72 |

* cited by examiner

【FIG. 1】
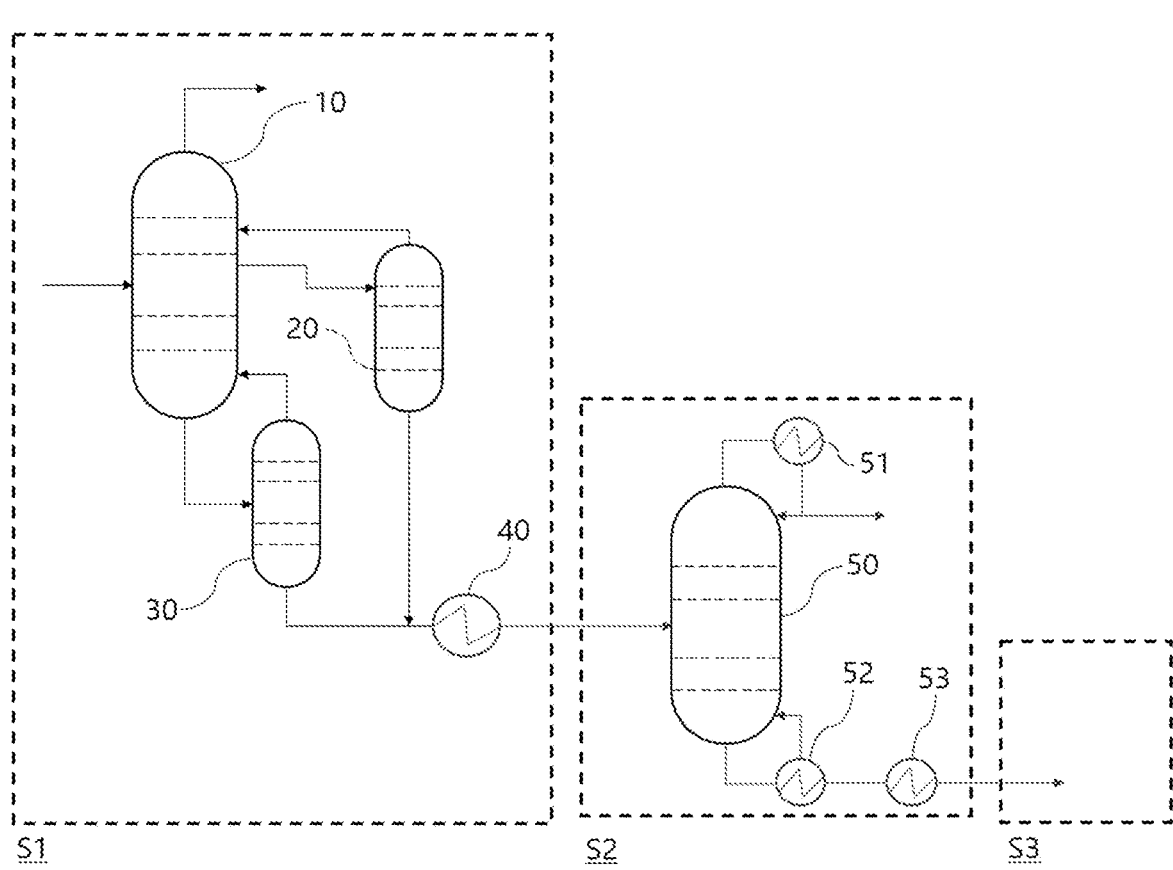

【FIG. 2】
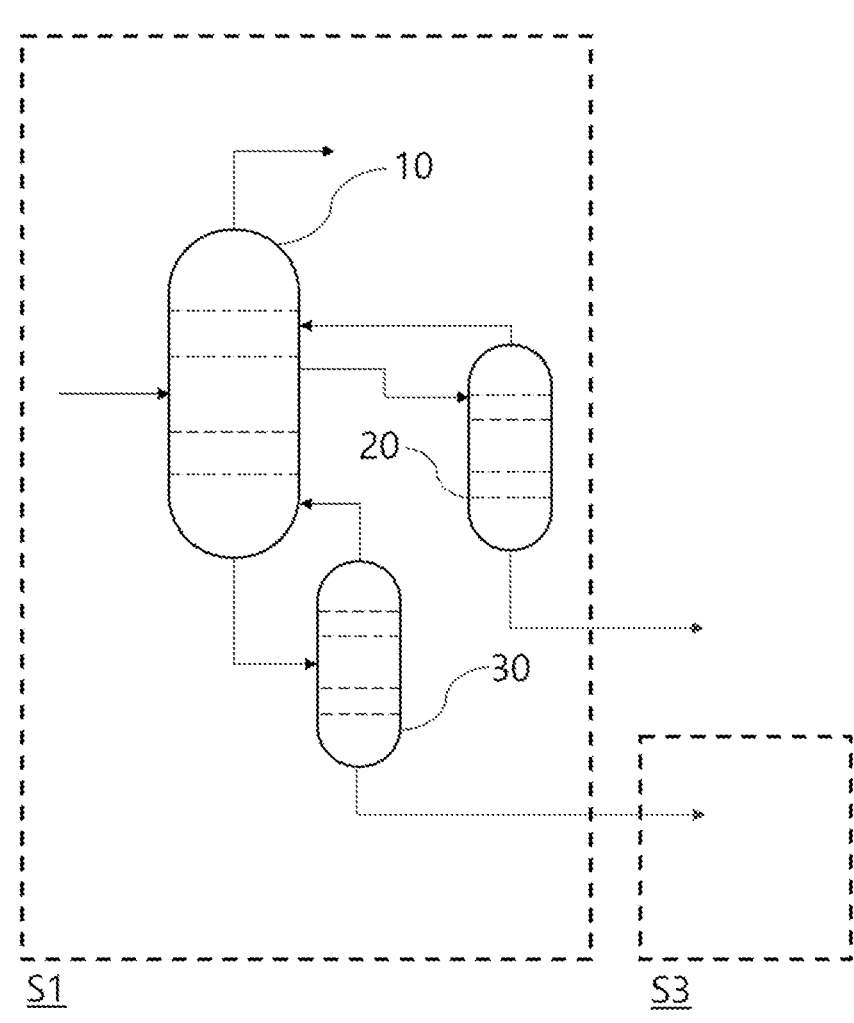
S1                                                      S3

【FIG. 3】
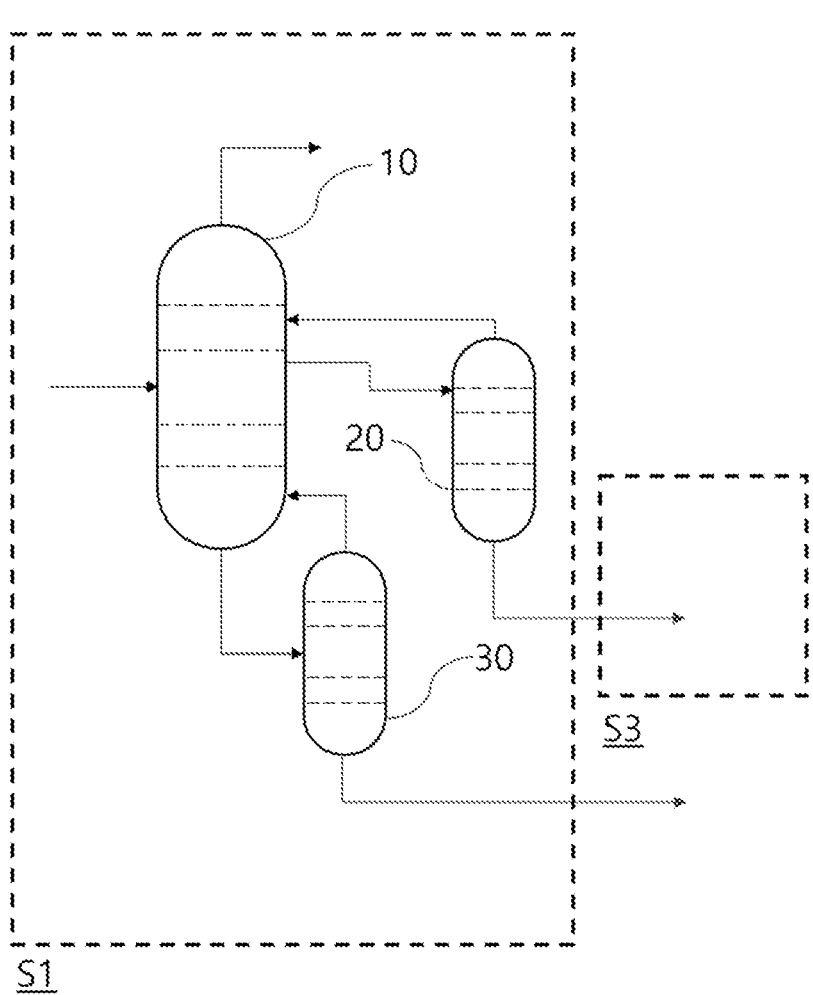

【FIG. 4】
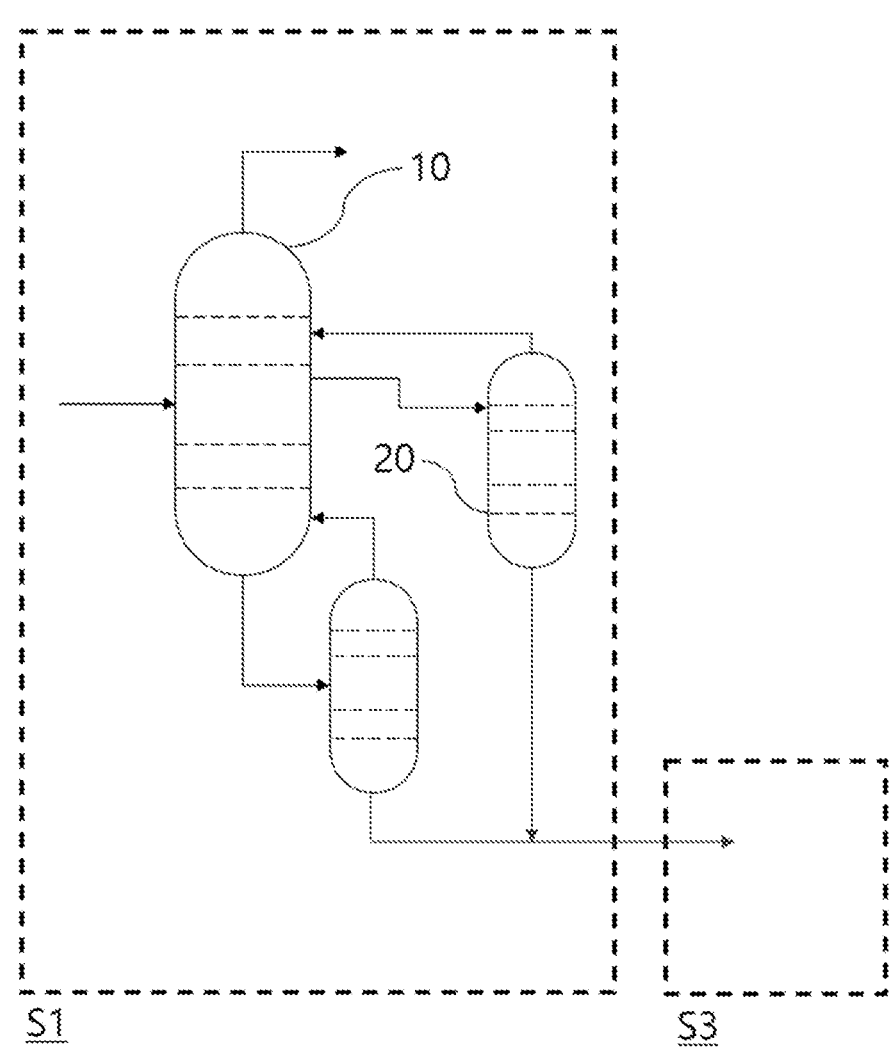

METHOD FOR PREPARING SYNTHESIS GAS

CROSS-REFERENCE TO RELATED APPLICATIONS

The present application is a National Phase entry pursuant to 35 U.S.C. § 371 of International Application No. PCT/KR2021/018398, filed on Dec. 6, 2021, and claims the benefit of and priority to Korean Patent Application No. 10-2021-0013214, filed on Jan. 29, 2021, the entire contents of which are incorporated by reference in their entirety for all purposes as if fully set forth herein.

TECHNICAL FIELD

The present invention relates to a method for preparing synthesis gas, and more particularly, to a method for preparing synthesis gas which allows pyrolyzed fuel oil (PFO) in a naphtha cracking center (NCC) process to be used as a raw material of a gasification process.

BACKGROUND ART

Synthesis gas (syngas) is an artificially prepared gas, unlike natural gas such as spontaneous gas, methane gas, and ethane gas, which is released from land in oil fields and coal mine areas, and is prepared by a gasification process.

The gasification process is a process of converting a hydrocarbon such as coal, petroleum, and biomass as a raw material into synthesis gas mainly composed of hydrogen and carbon monoxide by pyrolysis or a chemical reaction with a gasifying agent such as oxygen, air, and water vapor. A gasifying agent and a raw material are supplied to a combustion chamber positioned at the foremost end of the gasification process to produce synthesis gas by a combustion process at a temperature of 700° C. or higher, and as a kinematic viscosity of the raw material supplied to the combustion chamber is higher, a differential pressure in the combustion chamber is increased or atomization is not performed well, so that combustion performance is deteriorated or a risk of explosion is increased due to excessive oxygen.

Conventionally, as a raw material of a gasification process for preparing synthesis gas using a liquid phase hydrocarbon raw material, refinery residues, such as vacuum residues (VR) and bunker-C oil, discharged from refinery where crude oil is refined were mainly used. However, since the refinery residue has a high kinematic viscosity, a pretreatment such as a heat treatment, a diluent, or water addition is required to be used as the raw material of the gasification process, and since the refinery residue has high contents of sulfur and nitrogen, production of acidic gas such as hydrogen sulfide and ammonia is increased during the gasification process, and thus, in order to respond to tightened environmental regulations, a need to replace the refinery residue with raw materials having low contents of sulfur and nitrogen is raised.

Meanwhile, a pyrolysis fuel oil (PFO) which is a by-product discharged from a naphtha cracking center (NCC) process which is a process of preparing petrochemical basic materials such as propylene is generally used as a fuel, but since the sulfur content is a high level for using the oil as a fuel without a pretreatment, the market is getting smaller due to the environmental regulations and a situation where sales are impossible in the future should be prepared.

Accordingly, the present inventors completed the present invention based on the idea that when the pyrolysis fuel oil (PFO) of the naphtha cracking center (NCC) process is used as the raw material of the gasification process, greenhouse gas emissions may be reduced, operating costs of the gasification process may be reduced, and process efficiency may be improved, as compared with the case of using the conventional refinery residue as a raw material.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

An object of the present invention is to provide a method for preparing synthesis gas which may reduce greenhouse gas emissions, reduce operating costs of a gasification process, and improve process efficiency, as compared with the case of a conventional refinery residue as a raw material, by using the pyrolysis fuel oil (PFO) of a naphtha cracking center (NCC) process as the raw material of the gasification process.

Technical Solution

In one general aspect, a method for preparing synthesis gas includes: supplying a PFO stream including a pyrolysis fuel oil (PFO) and a PGO stream including a pyrolysis gas oil (PGO) discharged from a naphtha cracking center (NCC) process to a distillation column as a feed stream (S10); and supplying a lower discharge stream from the distillation column to a combustion chamber for a gasification process (S20).

Advantageous Effects

According reducing a present invention, by using a pyrolysis fuel oil (PFO) of the naphtha cracking center (NCC) process as a raw material of a gasification process, greenhouse gas emissions may be reduced, operating costs of the gasification process may be reduced, and process efficiency may be improved, as compared with the case of using a conventional refinery residue as a raw material.

BRIEF DESCRIPTION OF DRAWINGS

FIG. 1 is a process flow diagram for a method for preparing synthesis gas according to an exemplary embodiment of the present invention.

FIG. 2 is a process flow diagram for a method for preparing synthesis gas according to Comparative Example 1 of the present invention.

FIG. 3 is a process flow diagram for a method for preparing synthesis gas according to Comparative Example 2 of the present invention.

FIG. 4 is a process flow diagram for a method for preparing synthesis gas according to Comparative Example 3 of the present invention.

DETAILED DESCRIPTION

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

The term "stream" in the present invention may refer to a fluid flow in a process, or may refer to a fluid itself flowing in a pipe. Specifically, the "stream" may refer to both a fluid itself flowing in a pipe connecting each device and a fluid flow. In addition, the fluid may refer to a gas or liquid, and a case in which a solid substance is included in the fluid is not excluded.

In the present invention, the term "C#" in which "#" is a positive integer represents all hydrocarbons having # carbon atoms. Therefore, the term "C8" represents a hydrocarbon compound having 8 carbon atoms. In addition, the term "C#-" represents all hydrocarbon molecules having # or less carbon atoms. Therefore, the term "C8-" represents a mixture of hydrocarbons having 8 or less carbon atoms. In addition, the term "C#+" represents all hydrocarbon molecules having # or more carbon atoms. Therefore, the term "C10+ hydrocarbon" represents a mixture of hydrocarbons having 10 or more carbon atoms.

Hereinafter, the present invention will be described in more detail with reference to the FIG. 1 for better understanding of the present invention.

According to the present invention, a method for preparing synthesis gas (syngas) is provided. Referring to the following Table 1, the method for preparing synthesis gas may include: supplying a PFO stream including a pyrolysis fuel oil (PFO) and a PGO stream including a pyrolysis gas oil (PGO) discharged from a naphtha cracking center process (S1) to a distillation column 50 as a feed stream (S10); and supplying a lower discharge stream from the distillation column 50 to a combustion chamber for a gasification process (S3) (S20).

The synthesis gas is an artificially prepared gas, unlike natural gas such as spontaneous gas, methane gas, and ethane gas, which is released from land in oil fields and coal mine areas, and is prepared by a gasification process.

The gasification process is a process of converting a hydrocarbon such as coal, petroleum, and biomass as a raw material into synthesis gas mainly composed of hydrogen and carbon monoxide by pyrolysis or a chemical reaction with a gasifying agent such as oxygen, air, and water vapor. A gasifying agent and a raw material are supplied to a combustion chamber positioned at the foremost end of the gasification process to produce synthesis gas by a combustion process at a temperature of 700° C. or higher, and as a kinematic viscosity of the raw material supplied to the combustion chamber is higher, a differential pressure in the combustion chamber is increased or atomization is not performed well, so that combustion performance is deteriorated or a risk of explosion is increased due to excessive oxygen.

Conventionally, as a raw material of a gasification process for preparing synthesis gas using a liquid phase hydrocarbon raw material, refinery residues, such as vacuum residues (VR) and bunker-C oil, discharged from refinery where crude oil is refined were mainly used. However, since the refinery residue has a high kinematic viscosity, a pretreatment such as a heat treatment, a diluent, or water addition is required to be used as the raw material of the gasification process, and since the refinery residue has high contents of sulfur and nitrogen, production of acidic gas such as hydrogen sulfide and ammonia is increased during the gasification process, and thus, in order to respond to tightened environmental regulations, a need to replace the refinery residue with raw materials having low contents of sulfur and nitrogen is raised. For example, among the refinery residues, a vacuum residue may include about 3.5 wt % of sulfur and about 3600 ppm of nitrogen, and bunker C-oil may include about 4.5 wt % of sulfur.

Meanwhile, a pyrolysis fuel oil (PFO) discharged from a naphtha cracking center process which is a process of cracking naphtha to prepare petrochemical basic materials such as ethylene and propylene is generally used as a fuel, but since the sulfur content is a high level for using the oil as a fuel without a pretreatment, the market is getting smaller due to the environmental regulations and a situation where sales are impossible in the future should be prepared.

Therefore, in the present invention, it is intended that greenhouse gas emissions may be reduced, operating costs of a gasification process are reduced, and process efficiency is improved, as compared with a case of using a conventional refinery residue as a raw material, by using a PFO stream including a pyrolysis fuel oil (PFO) discharged from a naphtha cracking center process and a PGO stream including a pyrolysis gas oil (PGO) as the raw material of the gasification process.

According to an exemplary embodiment of the present invention, the PFO stream including a pyrolysis fuel oil (PFO) and the PGO stream including a pyrolysis gas oil (PGO) may be discharged from a naphtha cracking center process (S1).

Specifically, the naphtha cracking center process is a process of cracking naphtha including paraffin, naphthene, and aromatics to prepare olefins such as ethylene and propylene used as a basic material for petrochemicals, and may be largely composed of a cracking process, a quenching process, a compression process, and a refining process.

The cracking process is a process of cracking naphtha into hydrocarbons having fewer carbons in a cracking furnace at 800° C. or higher, and may discharge cracked gas at a high temperature. Here, the naphtha may undergo a preheating process from high pressure water vapor before entering the cracking furnace, and then may be supplied to the cracking furnace.

The quenching process is a process of cooling the cracked gas at a high temperature, for suppressing a polymerization reaction of a hydrocarbon in cracked gas at a high temperature discharged from the cracking furnace, and recovering waste heat and decreasing a heat load in a subsequent process (compression process). Here, the quenching process may include primary cooling of the cracked gas at a high temperature with quench oil and secondary cooling with quench water.

Specifically, after the primary cooling and before the secondary cooling, the primarily cooled cracked gas may be supplied to a gasoline fractionator to separate light oils including hydrogen, methane, ethylene, propylene, and the like, pyrolysis gasoline (PG), the pyrolysis fuel oil (PFO), and the pyrolysis gas oil (PGO) therefrom. Thereafter, the light oil may be transported to a subsequent compression process.

The compression process may be a process of producing compressed gas having a reduced volume by elevating pressure of the light oil under high pressure for economically separating and refining the light oil.

The refining process is a process of cooling the compressed gas which is compressed with high pressure to a cryogenic temperature and then separating the components in stages by a boiling point difference, and may produce hydrogen, ethylene, propylene, propane, C4 oils, pyrolysis gasoline (PG), and the like.

As described above, from the quenching process of the naphtha cracking center process (S1), a pyrolysis fuel oil (PFO) and a pyrolysis gas oil (PGO) may be discharged. In general, the pyrolysis fuel oil (PFO) includes about 0.1 wt % of less of sulfur and about 20 ppm or less of nitrogen, and when it is used as a fuel, sulfur oxides (Sox) and nitrogen oxides (NOx) are discharged during a combustion process, and thus, environmental issues may be raised.

Accordingly, in the present invention, the above problems may be solved by pretreating a mixed oil stream in which the pyrolysis fuel oil (PFO) and the pyrolysis gas oil (PGO) are mixed and using the mixed oil stream as the raw material of the gasification process, and furthermore, greenhouse gas emissions may be reduced, operating costs of the gasification process may be reduced, and process efficiency may be improved, as compared with a case of using a conventional refinery residue as the raw material of the gasification process.

According to an exemplary embodiment of the present invention, as described above, the PFO stream and the PGO stream of the present invention may include the pyrolysis fuel oil (PFO) and the pyrolysis gas oil (PGO) discharged from the gasoline fractionator 10 of the naphtha cracking center process (S1), respectively. As a specific example, in the total number of stages of the gasoline fractionator 10 shown in FIG. 1, when a top stage is expressed as a stage at 1% and a bottom stage is expressed as a stage at 100%, the pyrolysis fuel oil (PFO) may be discharged from a stage at 90% or more, 95% or more, or 95% to 100%, and the pyrolysis gas oil (PGO) may be discharged from a stage at 10% to 70%, 15% to 65%, or 20% to 60%, relative to the total number of stages of the gasoline fractionator 10. For example, when the total number of stages of the gasoline fractionator 10 is 100, a top stage may be a first stage and a bottom stage may be a 100th stage, and a stage at 90% or more of the total number of stages of the gasoline fractionator 10 may refer to a 90th stage to a 100th stage of the gasoline fractionator 10.

According to an exemplary embodiment of the present invention, as shown in FIG. 1, the PGO stream is discharged from a side portion of the gasoline fractionator 10 of the naphtha cracking center process (S1) and may be a lower discharge stream which is discharged from a lower portion of a first stripper 20 after supplying a side discharge stream including the pyrolysis gas oil (PGO) to the first stripper 20, and the PFO stream is discharged from a lower portion of the gasoline fractionator 10 of the naphtha cracking center process (S1) and may be a lower discharge stream which is discharged from a lower portion of a second stripper 30 after supplying a lower discharge stream including the pyrolysis fuel oil (PFO) to the second stripper 30.

The first stripper 20 and the second stripper 30 may be devices in which a stripping process of separating and removing gas or vapor dissolved in a liquid is performed, and for example, may be performed by a method such as direct contact, heating, and pressing by, for example, steam, inert gas, or the like. As a specific example, the side discharge stream from the gasoline fractionator 10 is supplied to the first stripper 20, thereby refluxing an upper discharge stream from the first stripper 20 including a light fraction separated from the side discharge stream from the gasoline fractionator 10 to the gasoline fractionator 10. In addition, the lower discharge stream from the gasoline fractionator 10 is supplied to the second stripper 30, thereby refluxing an upper discharge stream from the second stripper 30 including a light fraction separated from the lower discharge stream from the gasoline fractionator 10 to the gasoline fractionator 10.

According to an exemplary embodiment of the present invention, the PGO stream may include 70 wt % or more or 70 wt % to 95 wt % of C10 to C12 hydrocarbons, and the PFO stream may include 70 wt % or more or 70 wt % to 98 wt % of C13+ hydrocarbons. For example, the PGO stream including 70 wt % or more of C10 to C12 hydrocarbons may have a kinematic viscosity at 40° C. of 1 to 200 cSt and a flash point of 10 to 50° C. In addition, for example, the PFO stream including 70 wt % or more of C13+ hydrocarbons may have a kinematic viscosity at 40° C. of 400 to 100,000 cSt and a flash point of 70 to 200° C. As such, the PFO stream including more heavy hydrocarbons than the PGO stream may have a higher kinematic viscosity and a higher flash point than the pyrolysis gas oil under the same temperature conditions.

According to an exemplary embodiment of the present invention, the PGO stream may have a boiling point of 200 to 288° C. or 210 to 270° C., and the PFO stream may have a boiling point of 289 to 550° C. or 300 to 500° C.

The boiling points of the PGO stream and the PFO stream may refer to the boiling points of the PGO stream and the PFO stream in a bulk form, each composed of a plurality of hydrocarbons. Here, the kind of hydrocarbons included in the PGO stream and the kind of hydrocarbons included in the PFO stream may be different from each other, and some kinds may be the same. As a specific example, the kind of hydrocarbons included in the PGO stream and the PFO stream may be included as described above.

According to an exemplary embodiment of the present invention, in step (S10), the PFO stream including a pyrolysis fuel oil (PFO) discharged from the naphtha cracking center process (S1) and the PGO stream including a pyrolysis gas oil (PGO) may be supplied to a distillation column 50 as a feed stream.

The feed stream supplied to the distillation column 50 includes both the PGO stream and the PFO stream, and may include both heavies and lights. As such, the feed stream including both the heavies and lights is supplied to the distillation column 50, and by discharging an upper discharge stream including lights from the upper portion of the distillation column 50, a lower discharge stream having a kinematic viscosity and a flash point which are adjusted from the lower portion of the distillation column 50 may be obtained. As a specific example, the PFO stream having a higher content of heavies than the PGO stream may have higher kinematic viscosity and flash point than the PGO stream, and the PGO stream having a higher content of lights than the PFO stream may have lower kinematic viscosity and flash point than the PFO stream. In the feed stream including both two conflicting streams, a stream having desired kinematic viscosity and flash point may be discharged from the lower portion of the distillation column 50 by removing the lights, as described above.

According to an exemplary embodiment of the present invention, a ratio of the flow rate of the upper discharge stream from the distillation column 50 relative to the flow rate of the feed stream supplied to the distillation column 50 (hereinafter, referred to as "distillation ratio of distillation column 50") may be 0.01 to 0.2, 0.01 to 0.15, or 0.03 to 0.15. That is, in step (S10), the distillation ratio of the distillation column 50 may be adjusted to 0.01 to 0.2, 0.01 to 0.15, or 0.03 to 0.15. Herein, the "flow rate" may refer to a flow of a weight per unit hour. As a specific example, the unit of the flow rate may be kg/h.

The distillation ratio of the distillation column 50 in the above range is adjusted by a flow rate adjustment device (not shown) installed in a pipe in which the upper discharge stream from the distillation column 50 is transported, and the performance of the distillation column 50 may be performed by adjusting a reflux ratio of the upper discharge stream of the distillation column 50, using the distillation ratio and a second heat exchanger 51, shown in the pretreatment process (S2) of FIG. 1. Here, the reflux ratio may refer to a ratio of the flow rate of the reflux stream to the flow rate of an outflow stream, and as a specific example, the reflux ratio of the upper discharge stream of the distillation column 50 may refer to, when a part of the upper discharge stream from the distillation column 50 is branched and refluxed to the distillation column 50 as a reflux stream and the rest is discharged as an outflow stream, a ratio of the flow rate of the reflux stream to the flow rate of the outflow stream (hereinafter, referred to as a "reflux ratio"). As a more specific example, the reflux ratio may be 0.01 to 10, 0.1 to 7, or 0.15 to 5.

As described above, a gasifying agent and a raw material are supplied to the combustion chamber (not shown) positioned at the foremost end of the gasification process (S3) to produce synthesis gas by a combustion process at a temperature of 700° C. or higher. Here, the reaction of producing synthesis gas is performed under a high pressure of 20 to 80 atm, and the raw material in the combustion chamber should be moved at a high flow velocity of 2 to 40 m/s. Therefore, the raw material should be pumped at a high flow velocity under a high pressure for the reaction of producing synthesis gas, and when the kinematic viscosity of the raw material supplied to the combustion chamber is higher than an appropriate range, a high-priced pump should be used due to reduced pumpability or costs are increased due to increased energy consumption, and pumping to desired conditions may be impossible. In addition, since pumping is not performed well, the raw material may not be uniformly supplied to the combustion chamber. In addition, since a differential pressure in the combustion chamber is raised or uniform atomization of the raw material is not performed well due to its small particle size, combustion performance may be deteriorated, productivity may be lowered, a large amount of gasifying agent is required, and a risk of explosion is increased due to excessive oxygen. Here, an appropriate range of the kinematic viscosity may be somewhat different depending on the kind of synthesis gas, conditions of the combustion process performed in the combustion chamber, and the like, but generally, a lower kinematic viscosity of the raw material is better in terms of costs, productivity, and safety, at a temperature of the raw material at the time of supply to the combustion chamber in the gasification process (S3), and it is preferred that the kinematic viscosity is in a range of 300 cSt or less and within the range, a differential pressure rise in the combustion chamber is prevented within the range, and atomization is performed well to improve combustion performance.

In addition, when the flash point of the raw material supplied to the combustion chamber is lower than an appropriate range, flame may occur in a burner before combustion reaction occurrence, a risk of explosion is present by a backfire phenomenon of the flame in the combustion chamber, and the refractories in the combustion chamber may be damaged. Here, an appropriate range of the flash point may be varied depending on the kind of synthesis gas to be synthesized, conditions of the combustion process performed in the combustion chamber, and the like, but generally, it is preferred that the flash point of the raw material is in a range of being higher than the temperature of the raw material at the time of supply to the combustion chamber in the gasification process (S3) by 25° C. or more, and within the range, a loss of the raw material, an explosion risk, and damage of refractories in the combustion chamber may be prevented.

Accordingly, in the present invention, in order to control the kinematic viscosity and the flash point of the lower discharge stream from the distillation column 50 which is the raw material supplied to the combustion chamber in the gasification process (S3) to appropriate ranges, the distillation ratio of the distillation column 50 may be adjusted. That is, by adjusting the distillation ratio of the distillation column 50, the kinematic viscosity and the flash point of the lower discharge stream from the distillation column 50 may be controlled to appropriate ranges, at a temperature when the lower discharge stream from the distillation column 50 is supplied to the combustion chamber.

According to an exemplary embodiment of the present invention, the temperature of the lower discharge stream from the distillation column 50 at the time of supply to the combustion chamber may be lower than the flash point of the lower discharge stream from the distillation column 50 at the time of supply to the combustion chamber by 25° C. or more and may be a temperature at which the kinematic viscosity is 300 cSt or less. That is, the lower discharge stream from the distillation column 50 may have the kinematic viscosity at the time of supply to the combustion chamber of 300 cSt or less or 1 cSt to 300 cSt, and the flash point of the lower discharge stream from the distillation column 50 may be higher than the temperature at the time of supply to the combustion chamber by 25° C. or more or by 25° C. to 150° C. Here, the temperature of the lower discharge stream from the distillation column 50 at the time of supply to the combustion chamber may be 20° C. to 90° C. or 30° C. to 80° C. The kinematic viscosity of the lower discharge stream from the distillation column 50 at the temperature at the time of supply to the combustion chamber within the range may be 300 cSt or less and may be further lower than the flash point by 25° C. or more, and thus, may satisfy the process operating conditions for use as the raw material of the gasification process (S3).

Specifically, by adjusting the distillation ratio of the distillation column 50 to 0.01 to 0.2, 0.01 to 0.15, or 0.03 to 0.15, when the lower discharge stream from the distillation column 50 is supplied to the combustion chamber, the flash point of the lower discharge stream from the distillation column 50 may be higher than the temperature of the lower discharge stream from the distillation column 50 at the time of the supply by 25° C. or more, and the kinematic viscosity thereof may be in a range of 300 cSt or less at the temperature of the lower discharge stream from the distillation column 50 at the time of the supply.

When the distillation ratio of the distillation column 50 is 0.01 to 0.2, a light material having a low flash point is removed in the situation where both the flash point and the kinematic viscosity are low, whereby the increase range of the flash point is more increased than the increase range of the kinematic viscosity, and thus, the flash point and the kinematic viscosity may be controlled to the ranges of the flash point and the kinematic viscosity when the lower discharge stream from the distillation column 50 is supplied to the combustion chamber. However, when the distillation ratio of the distillation column 50 is less than 0.01, it is difficult to control the flash point when the lower discharge stream from the distillation column 50 is supplied to the combustion chamber to be higher than the temperature when the lower discharge stream from the distillation column 50 is supplied to the combustion chamber by 25° C. or more, and when the distillation ratio of the distillation column 50 is more than 0.2, the increase range of the kinematic viscosity is more increased than the increase range of the flash point, and thus, it is difficult to control the kinematic viscosity to 300 cSt or less.

As such, by adjusting the distillation ratio of the distillation column 50, the flash point and the kinematic viscosity of the lower discharge stream from the distillation column 50 at the time of supply to the combustion chamber may be controlled, and thus, the lower discharge stream from the distillation column may have the physical properties appropriate for use as the raw material of the gasification process (S3).

Meanwhile, for example, when the PFO stream is directly supplied to the combustion chamber without the pretreatment process (S2) as shown in FIG. 2, the PGO stream is directly supplied to the combustion chamber without the pretreatment process (S2) as shown in FIG. 3, or the PGO stream and the PFO stream are directly supplied to the combustion chamber without the pretreatment process (S2) according to the present invention, a temperature satisfying both the kinematic viscosity and the flash point in the appropriate range described above may not exist. As such, when the PFO stream, the PGO stream, or the mixed stream of the PFO stream and the PGO stream is supplied to the combustion chamber at the temperature which does not satisfy any one of the kinematic viscosity and the flash point in the appropriate ranges, a differential pressure in the combustion chamber is raised or atomization is not performed well to deteriorate combustion performance, and an explosion risk is increased due to excessive oxygen, or flame may occur in the burner before a combustion reaction occurs, and an explosion risk is present by a backfire phenomenon of flame in the combustion chamber and refractories in the combustion chamber may be damaged.

In general, the PFO stream and the PGO stream are the heaviest residues in the NCC process and have been used as a simple fuel, and when they are used as a simple fuel as such, it is not necessary to adjust the compositions and the physical properties thereof. However, as in the present invention, in order to use the stream as the raw material of the synthesis gas, specific physical properties, for example, both a kinematic viscosity and a flash point should be satisfied. However, the PGO stream satisfies the kinematic viscosity but has a too low flash point, and the PFO stream has a high flash point but has a too high kinematic viscosity, and thus, each stream may not satisfy both the kinematic viscosity and the flash point and it is difficult to use each of the streams as the raw material of the synthesis gas. In addition, when the PFO stream and the PGO stream are all used as the raw material of the synthesis gas, generally a ratio of the flow rate of the PGO stream relative to the flow rate of the entire stream of the PFO stream and the PGO stream is about 0.35 to 0.7, and in this case also, both the kinematic viscosity and the flash point may not be satisfied and it is difficult to use the stream as the raw material of the synthesis gas. In this regard, in the present invention, the entire amount of the PFO stream and the PGO stream is supplied to the distillation column 50 and pretreated, thereby, when the lower discharge stream from the distillation column 50 is supplied to the combustion chamber, controlling the flash point of the lower discharge stream from the distillation column 50 to a range higher than the temperature of the lower discharge stream from the distillation column 50 at the time of supply by 25° C. or more, and also controlling the kinematic viscosity to a range of 300 cSt or less at the temperature of the lower discharge stream from the distillation column 50 at the time of supply, and thus, the conditions for use as the raw material of the synthesis gas may be satisfied.

According to an exemplary embodiment of the present invention, the upper discharge stream from the distillation column 50 may have a content of C10+ hydrocarbon of 15 wt % or less or 0.1 wt % to 15 wt % and a content of C8-hydrocarbon of 70 wt % or more or 70 wt % to 95 wt %, and the lower discharge stream from the distillation column 50 may have a content of C10+ hydrocarbon of 80 wt % or more or 80 wt % to 98 wt % and a content of C8-hydrocarbon of 5 wt % or less or 0.01 wt % to 5 wt %.

For example, the C8-hydrocarbon may include one or more selected from the group consisting of pentane, pentene, pentadiene, methylbutene, cyclopentane, cyclopentene, hexane, cyclohexane, heptane, methylhexane, octane, benzene, toluene, xylene, and styrene. As a specific example, the C8-hydrocarbon may include all kinds of C8-hydrocarbons described above, but is not limited thereto.

In addition, for example, the C10+ hydrocarbon may include one or more selected from the group consisting of dicyclopentadiene, naphthalene, methylnaphthalene, tetramethylbenzene, fluorene, and anthracene. As a specific example, the C10+ hydrocarbon may include all kinds of C10+ hydrocarbons described above, but is not limited thereto.

According to an exemplary embodiment of the present invention, the feed stream in step (S10) may be a mixed oil stream in which the PFO stream and the PGO stream are mixed. In this case, for example, a ratio of the flow rate of the PGO stream in the mixed oil stream relative to the flow rate of the mixed oil stream (hereinafter, referred to as "flow rate ratio of PGO stream") may be 0.35 to 0.7, 0.4 to 0.65, or 0.4 to 0.6, but is not limited thereto.

According to an exemplary embodiment of the present invention, the boiling point of the mixed oil stream may be 200° C. to 600° C., 210 to 550° C., or 240° C. to 500° C.

The boiling point of the mixed oil stream may refer to a boiling point of the mixed oil stream in a bulk form composed of a plurality of hydrocarbons. Here, the kind of hydrocarbons included in the mixed oil stream may include all of C8-hydrocarbons and C10+ hydrocarbons, described above.

According to an exemplary embodiment of the present invention, the mixed oil stream may pass through the first heat exchanger 40 before being supplied to the distillation column 50, and then may be supplied to the distillation column 50. The mixed oil stream is produced by mixing the PGO stream and the PFO stream at a high temperature discharged from the first stripper 20 or the second stripper 30, and the temperature of the mixed oil stream at the time of supply to the distillation column 50 may be adjusted and also process energy may be reduced by reusing the sensible heat of the mixed oil stream which may be wasted as waste heat in the process using the heat exchanger 40.

According to an exemplary embodiment of the present invention, the third heat exchanger 52 may be operated as a general reboiler.

According to an exemplary embodiment of the present invention, the lower discharge stream from the distillation column 50 may pass through a fourth heat exchanger 53 before being supplied to the gasification process (S3), and then may be supplied to the gasification process (S3). In this case, the temperature of the lower discharge stream from the distillation column 50 at the time of supply to gasification process (S3) may be adjusted and also process energy may be reduced, by reusing the sensible heat of the lower discharge stream from the distillation column 50 which may be wasted as waste heat in the process using the fourth heat exchanger 53.

According to an exemplary embodiment of the present invention, the mixed oil stream may be supplied to a stage at 10% to 70%, 15% to 60%, or 20% to 50% of the total number of stages of the distillation column 50. Within the range, the distillation column 50 may be efficiently operated, thereby significantly reducing unnecessary energy consumption.

According to an exemplary embodiment of the present invention, burning the lower discharge stream from the distillation column 50 supplied to the combustion chamber in the gasification process (S3) at a temperature of 700° C. or higher, 700 to 2000° C., or 800 to 1800° C. (S30) may be further included. In addition, in step (S20), the lower discharge stream from the distillation column 50 may be supplied to the combustion chamber together with the gasifying agent. Here, the gasifying agent may include one or more selected from the group consisting of oxygen, air, and water vapor, and as a specific example, the gasifying agent may be oxygen or water vapor.

As such, the lower discharge stream from the distillation column 50 is burned at a high temperature in the presence of the gasifying agent, thereby preparing the synthesis gas. The synthesis gas prepared according to the preparation method of the present invention includes carbon monoxide and hydrogen and may further include one or more selected from the group consisting of carbon dioxide, ammonia, hydrogen sulfide, hydrogen cyanide, and carbonyl sulfide.

According to an exemplary embodiment of the present invention, in the method for preparing synthesis gas, if necessary, devices such as a valve, a pump, a separator, and a mixer may be further installed.

Hereinabove, the method for preparing synthesis gas according to the present invention has been described and illustrated in the drawings, but the description and the illustration in the drawings are the description and the illustration of only core constitutions for understanding of the present invention, and in addition to the process and the devices described above and illustrated in the drawings, process and the devices which are not described and illustrated separately may be appropriately applied and used for carrying out the method for preparing synthesis gas according to the present invention.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Examples 1 to 5

According to the process flow diagram shown in FIG. 1, synthesis gas was prepared.

Specifically, a side discharge stream discharged from a stage at 40% relative to the total number of stages of a gasoline fractionator 10 of a naphtha cracking center process (S1) was supplied to a first stripper 20, and then a PGO stream including a pyrolysis gas oil (PGO) was discharged from a lower portion of the first stripper 20, and at this time, it was confirmed that the content of C10 to C12 in the PGO stream was 86 wt %. In addition, the lower discharge stream discharged from a stage at 100% relative to the total number of stages of the gasoline fractionator 10 was supplied to a second stripper 30, and then a PFO stream including a pyrolysis fuel oil (PFO) was discharged from a lower portion of the second stripper 30, and at this time, it was confirmed that the content of C13+ in the PFO stream was 89 wt %.

Next, the PGO stream and the PFO stream were mixed to produce a mixed oil stream. At this time, the PGO stream had a flash point of 25.5° C. and a kinematic viscosity at 40° C. of 75 cSt, and the PFO stream had a flash point of 98° C. and a kinematic viscosity at 40° C. of 660 cSt. In addition, a ratio of the flow rate of the PGO stream to the flow rate of the mixed oil stream was 0.42.

Next, the mixed oil stream was supplied to the distillation column 50 by a pretreatment process (S2), the distillation ratio of the distillation column 50 was adjusted and the upper discharge stream was discharged from the distillation column 50, and the lower discharge stream from the distillation column 50 was supplied to a combustion chamber in a gasification process (S3) together with oxygen and vapor, thereby preparing synthesis gas including hydrogen and carbon monoxide. At this time, the reflux ratio of the distillation column 50 was controlled to 2.5.

The kinematic viscosity and the flash point of the mixed oil stream at 40° C., the distillation ratio of the distillation column 50, the temperature of the lower discharge stream from the distillation column 50 when the lower discharge stream from the distillation column 50 is supplied to the combustion chamber, and the flash point of the lower discharge stream from the distillation column 50 were measured and are shown in Table 1. In addition, it was confirmed whether the process operating standards were satisfied according to the measurement results. At this time, the time when the lower discharge stream from the distillation column 50 was supplied to the combustion chamber was set to temperature conditions to control the kinematic viscosity to 300 cSt.

The kinematic viscosity and the flash point were measured as follows, and were applied to all of the examples and the comparative examples.

(1) Kinematic viscosity: A sample was obtained from the stream of the sample to be measured and measurement was performed based on ASTM D7042 using SVM 3001 available from Anton Paar. In addition, the temperature of each of the samples was maintained at a temperature lower than a kinematic viscosity measurement temperature by 10° C., and the sample was stored in a closed container for preventing vaporization of light materials to minimize occurrence of a gas phase.

(2) Flash point: A sample was obtained from the stream of the sample to be measured and measurement was performed based on ASTM D93 using apm-8 available from TANAKA. In addition, the temperature of each of the samples was maintained at a temperature lower than an expected flash point by 10° C., and the sample was stored in a closed container for preventing vaporization of light materials to minimize occurrence of a gas phase.

COMPARATIVE EXAMPLE

Comparative Example 1

According to the process flow diagram shown in FIG. 2, synthesis gas was prepared.

Specifically, the lower discharge stream discharged from a stage at 100% relative to the total number of stages of the gasoline fractionator 10 of the naphtha cracking center process (S1) was supplied to the second stripper 30, and the PFO stream including a pyrolysis fuel oil (PFO) was discharged from the lower portion of the second stripper 30. Next, the PFO stream was supplied to the combustion chamber in the gasification process (S3) together with oxygen and vapor. At this time, it was confirmed that the content of C13+ in the PFO stream was 89 wt %, and the PFO stream had the flash point of 98° C. and the kinematic viscosity at 40° C. of 660 cSt.

The temperature of the PFO stream at the time of supply to the combustion chamber was measured and is shown in the following Table 2. In addition, it was confirmed whether the process operating standards were satisfied according to the measurement results. At this time, the time when the PFO stream was supplied to the combustion chamber was set to temperature conditions to control the kinematic viscosity to 300 cSt.

Comparative Example 2

According to the process flow diagram shown in FIG. 3, synthesis gas was prepared.

Specifically, the side discharge stream discharged from a stage at 40% relative to the total number of stages of the gasoline fractionator 10 of the naphtha cracking center process (S1) was supplied to the first stripper 20, and then the PGO stream including a pyrolysis gas oil (PGO) was discharged from the lower portion of the first stripper 20. Next, the PGO stream was supplied to the combustion chamber in the gasification process (S3) together with oxygen and vapor. At this time, it was confirmed that the content of C10 to C12 in the PGO stream was 86 wt %, and the PGO stream had the flash point of 25.5° C. and the kinematic viscosity at 40° C. of 75 cSt.

The temperature of the PGO stream at the time of supply to the combustion chamber was measured and is shown in the following Table 2. In addition, it was confirmed whether the process operating standards were satisfied according to the measurement results. At this time, the time when the PGO stream was supplied to the combustion chamber was set to temperature conditions to control the kinematic viscosity to 300 cSt.

Comparative Example 3

According to the process flow diagram shown in FIG. 4, synthesis gas was prepared.

Specifically, a side discharge stream discharged from a stage at 50% relative to the total number of stages of a gasoline fractionator 10 of a naphtha cracking center process (S1) was supplied to a first stripper 20, and then a PGO stream including a pyrolysis gas oil (PGO) was discharged from a lower portion of the first stripper 20, and at this time, it was confirmed that the content of C10 to C12 in the PGO stream was 86 wt %. The lower discharge stream discharged from a stage at 100% relative to the total number of stages of the gasoline fractionator 10 was supplied to the second stripper 30, the PFO stream including a pyrolysis fuel oil (PFO) was discharged from the lower portion of the second stripper 30, and at this time, it was confirmed that the content of C13+ in the PFO stream was 89 wt %.

Next, the PGO stream and the PFO stream were mixed to produce a mixed oil stream. At this time, the PGO stream had a flash point of 25.5° C. and a kinematic viscosity at 40° C. of 75 cSt, and the PFO stream had a flash point of 98° C. and a kinematic viscosity at 40° C. of 660 cSt. In addition, a ratio of the flow rate of the PGO stream to the flow rate of the mixed oil stream was 0.42. Next, the mixed oil stream was supplied to the combustion chamber in the gasification process (S3) together with oxygen and vapor.

The flash point of the mixed oil stream and the temperature of the mixed oil stream at the time of supply to the combustion chamber were measured and are shown in the following Table 2. In addition, it was confirmed whether the process operating standards were satisfied according to the measurement results. At this time, the time when the mixed oil stream was supplied to the combustion chamber was set to temperature conditions to control the kinematic viscosity to 300 cSt.

TABLE 1

| | Flash point of mixed oil stream (° C.) | Kinematic viscosity of mixed oil stream (cSt@40° C.) | Distillation ratio | Temperature of lower discharge stream at the time of supply (° C.) | Kinematic viscosity of lower discharge stream at the time of supply (cSt) | Flash point of lower discharge stream (° C.) | Whether process operating standards were satisfied |
|---|---|---|---|---|---|---|---|
| Example 1 | 70 | 365 | 0.005 | 48.3 | 300 | 73 | X |
| Example 2 | 70 | 365 | 0.01 | 49.2 | 300 | 75 | ○ |
| Example 3 | 70 | 365 | 0.1 | 60 | 300 | 90.5 | ○ |
| Example 4 | 70 | 365 | 0.2 | 73.3 | 300 | 99 | ○ |
| Example 5 | 70 | 365 | 0.3 | 97.6 | 300 | 105.5 | X |

TABLE 2

| | Flash point of stream (° C.) | Kinematic viscosity (cSt) of stream at the time of supply | Temperature of stream at the time of supply (° C.) | Whether process operating standards were satisfied |
|---|---|---|---|---|
| Comparative Example 1 (PFO) | 98 | 300 | 78 | X |
| Comparative Example 2 (PGO) | 25.5 | 300 | 14 | X |
| Comparative Example 3 (mixed oil) | 70 | 300 | 47 | X |

Referring to Tables 1 and 2, in Examples 2 to 4 in which according to the method for preparing synthesis gas of the present invention, the distillation ratio of the distillation column 50 was adjusted to the appropriate range (0.01 to 0.2) to produce the lower discharge stream, when the lower discharge stream from the distillation column 50 was supplied to the combustion chamber, the flash point of the lower discharge stream from the distillation column 50 was higher than the temperature of the lower discharge stream from the distillation column 50 at the time of the supply by 25° C. or more, and the kinematic viscosity thereof was in a range of 300 cSt or less at the temperature of the lower discharge stream from the distillation column 50 at the time of the supply. By having the flash point and the kinematic viscosity range as such, the process operating conditions for use as the raw material of the gasification process (S3) were satisfied.

In particular, as shown in FIG. 1, among the examples in which the lower discharge stream discharged from the distillation column 50 by the pretreatment process (S2) was supplied to the combustion chamber of the gasification process (S3), in Example 3 in which the distillation ratio of the distillation column 50 was controlled to a range of 0.03 to 0.15, it was confirmed that when the lower discharge stream from the distillation column 50 was supplied to the combustion chamber, the flash point of the lower discharge stream from the distillation column 50 was higher than the temperature of the lower discharge stream from the distillation column 50 at the time of the supply by 30° C. or more to allow more stable operation.

In addition, in Examples 1 and 5 in which the distillation ratio of the distillation column 50 was not adjusted to the appropriate range (0.01 to 0.2), it was found that when the kinematic viscosity at the temperature of the lower discharge stream from the distillation column 50 at the time of the supply was controlled to 300 cSt, the temperature of the lower discharge stream from the distillation column 50 at the time of the supply was not controlled to be lower than the flash point by 25° C. or more.

However, when the PFO stream was directly supplied to the combustion chamber without the pretreatment process (S2) as shown in FIG. 2 (Comparative Example 1), the PGO stream was directly supplied to the combustion chamber without the pretreatment process (S2) as shown in FIG. 3 (Comparative Example 2), or the mixed oil stream of the PGO stream and the PFO stream was directly supplied to the combustion chamber without the pretreatment process (S2) according to the present invention as shown in FIG. 4 (Comparative Example 3), it was confirmed that a temperature satisfying both the kinematic viscosity and the flash point in the appropriate range described above did not exist. As such, it was confirmed that the mixed oil streams of Comparative Examples 1 to 3 which did not satisfy the kinematic viscosity and the flash point in the appropriate ranges did not satisfy the process operating conditions for use as the raw material of the gasification process (S3).

Accordingly, when the raw material of the gasification process (S3) was supplied to the combustion chamber at the temperature which did not satisfy any one of the kinematic viscosity and the flash point in the appropriate ranges, it was confirmed that a differential pressure in the combustion chamber was raised or atomization was not performed well to deteriorate combustion performance, and an explosion risk was increased due to excessive oxygen, or flame may occur in the burner before a combustion reaction occurs, and an explosion risk was present by a backfire phenomenon of flame in the combustion chamber and refractories in the combustion chamber may be damaged.

The invention claimed is:

1. A method for preparing synthesis gas, the method comprising:
   supplying a pyrolysis fuel oil (PFO) stream including a PFO and a pyrolysis gas oil (PGO) stream including a PGO discharged from a naphtha cracking center (NCC) process to a distillation column as a feed stream (S10); and
   supplying a lower discharge stream from the distillation column to a combustion chamber for a gasification process to obtain synthesis gas (S20),
   wherein the lower discharge stream from the distillation column has a kinematic viscosity at the time of supply to the combustion chamber of 300 cSt or less, and
   wherein the lower discharge stream has a flash point higher than a temperature at the time of supply to the combustion chamber by 25° C. or more.

2. The method for preparing synthesis gas of claim 1, wherein a ratio of a flow rate of an upper discharge stream from the distillation column to a flow rate of the feed stream supplied to the distillation column is 0.01 to 0.2.

3. The method for preparing synthesis gas of claim 2, wherein the ratio of the flow rate of the upper discharge stream from the distillation column to the flow rate of the feed stream supplied to the distillation column is 0.03 to 0.15.

4. The method for preparing synthesis gas of claim 1,
   wherein the lower discharge stream from the distillation column has the kinematic viscosity at the time of supply to the combustion chamber of 1 cSt to 300 cSt, and
   wherein the lower discharge stream has the flash point higher than the temperature at the time of supply to the combustion chamber by 25° C. to 150° C.

5. The method for preparing synthesis gas of claim 1, wherein a temperature of the lower discharge stream from the distillation column at the time of supply to the combustion chamber is 20° C. to 90° C.

6. The method for preparing synthesis gas of claim 1, wherein the feed stream is a mixed oil stream in which the PFO stream and the PGO stream are mixed.

7. The method for preparing synthesis gas of claim 6, wherein the lower discharge stream from the distillation column passes through a heat exchanger before being supplied to the combustion chamber.

8. The method for preparing synthesis gas of claim 6, wherein the mixed oil stream is supplied to a stage at 10% to 70% relative to the total number of stages of the distillation column.

9. The method for preparing synthesis gas of claim 1,
   wherein the PGO stream includes 70 wt % or more of hydrocarbons having 10 to 12 carbon atoms, and
   wherein the PFO stream includes 70 wt % or more of hydrocarbons having 13 or more carbon atoms.

10. The method for preparing synthesis gas of claim 1,
   wherein the PGO stream has a flash point of 10 to 50° C., and
   wherein the PFO stream has a flash point of 70 to 200° C.

11. The method for preparing synthesis gas of claim 1,
   wherein the PGO stream has a kinematic viscosity at 40° C. of 1 to 200 cSt, and
   wherein the PFO stream has a kinematic viscosity at 40° C. of 400 to 100,000 cSt.

12. The method for preparing synthesis gas of claim 1,
   wherein the PGO stream is a lower discharge stream discharged from a lower portion of a first stripper after supplying a side discharge stream discharged from a side portion of a gasoline fractionator of the naphtha cracking center (NCC) process to the first stripper, and wherein the PFO stream is a lower discharge stream discharged from a lower portion of a second stripper after supplying a lower discharge stream discharged from a lower portion of the gasoline fractionator of the naphtha cracking center (NCC) process to the second stripper.

13. The method for preparing synthesis gas of claim 12, wherein the lower discharge stream from the gasoline fractionator is discharged from a stage at 90% or more relative to the total number of stages of the gasoline fractionator, and wherein the side discharge stream from the gasoline fractionator is discharged from a stage at 10% to 70% relative to the total number of stages of the gasoline fractionator.

14. The method for preparing synthesis gas of claim 1, wherein an upper discharge stream from the distillation column has a content of hydrocarbons having 10 or more carbon atoms of 15 wt % or less and a content of hydrocarbons having 8 or less carbon atoms of 70 wt % or more, and wherein the lower discharge stream from the distillation column has a content of hydrocarbons having 10 or more carbon atoms of 80 wt % or more and a content of hydrocarbons having 8 or less carbon atoms of 5 wt % or less.

15. The method for preparing synthesis gas of claim 1, wherein a part of an upper discharge stream from the distillation column is branched and refluxed to the distillation column as a reflux stream, and the rest is discharged as an outflow stream, and wherein a reflux ratio of a flow rate of the reflux stream to a flow rate of the outflow stream is 0.01 to 10.

16. The method for preparing synthesis gas of claim 1, wherein the synthesis gas includes carbon monoxide and hydrogen.

* * * * *